Dec. 31, 1929.　　　W. G. LERCH　　　1,741,997
PROCESS OF MARKING TIRES
Filed March 14, 1928　　2 Sheets-Sheet 2

INVENTOR.
WILLIAM G. LERCH.
BY Ely + Barrow
ATTORNEYS.

Patented Dec. 31, 1929

1,741,997

UNITED STATES PATENT OFFICE

WILLIAM G. LERCH, OF AKRON, OHIO, ASSIGNOR TO THE INDIA TIRE & RUBBER COMPANY, OF MOGADORE, OHIO, A CORPORATION OF OHIO

PROCESS OF MARKING TIRES

Application filed March 14, 1928. Serial No. 261,671.

The present invention relates to pneumatic tires and particularly to a new and improved construction of tire casings which are provided with stripes, usually placed about the side walls of the tire at the junction of the tread. These stripes are generally made of a contrasting color from the body of the tire and are for the purpose of decorating the tire, or marking the tire to distinguish its origin, and this operates as a trade-mark or trade insignia. A number of tire companies adopt this method of marking tires and various colors of stripes are used by different companies to designate tires of their own manufacture.

The accepted method of applying these stripes by the tire manufacturers, prior to this invention, has been by the application of thin gum strips of rubber compounded with the proper coloring ingredients, which gum strips are placed about the tire as one of the finishing operations before the tire is vulcanized. The results of this process have been far from satisfactory, as the thin strip of rubber is very difficult of correct application, and as a result the strip was often wavy and irregular. In addition, the flow of rubber during the vulcanizing treatment often displaced or partially obliterated the gum strip so that an uneven or distorted stripe resulted. In addition the gum strip would be easily worn off when the tire was in service, due to abrasion of the side of the tire against curbing or ruts.

The process described and illustrated herein is designed for the purpose of improving upon the prior processes of marking tires as described above, and provides a simple, and a very effective method of striping tires by which even, regular stripes are obtained which do not easily become obliterated in use. As the striping is applied after the tire is vulcanized the objection of displacement in subsequent operation is not present. The new form of tire is covered in my copending application, Serial No. 261,670, filed of even date herewith, the present application being directed to the process as described.

Figure 1:
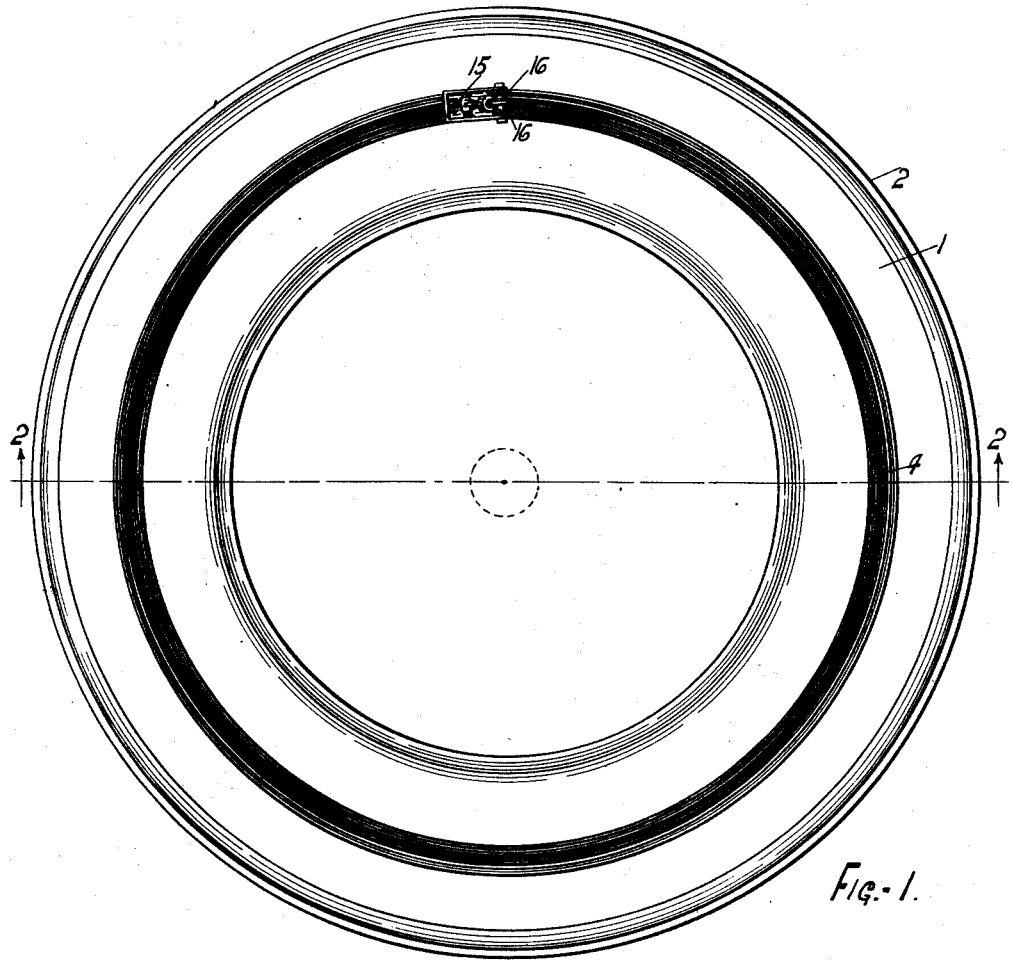
Figure 1 is a plan view of a tire with the striping tool in position therein.
Figure 2:
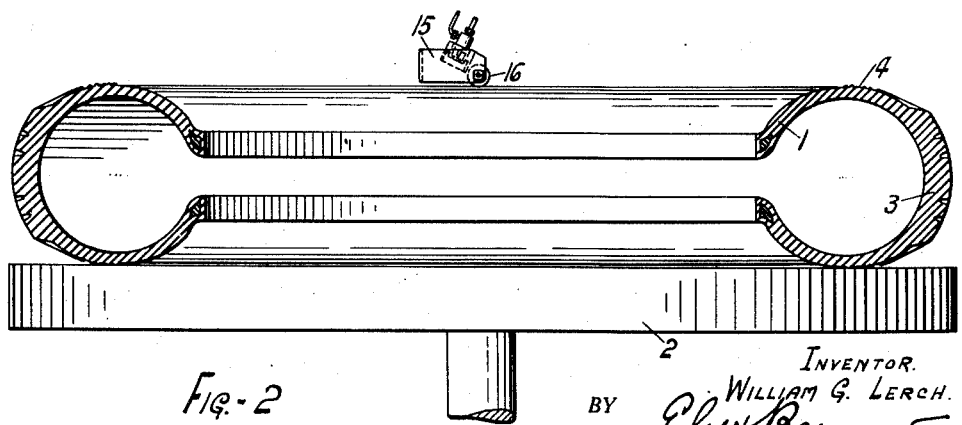
Figure 2 is a vertical section on the line 2—2 of Figure 1.
Figure 3:
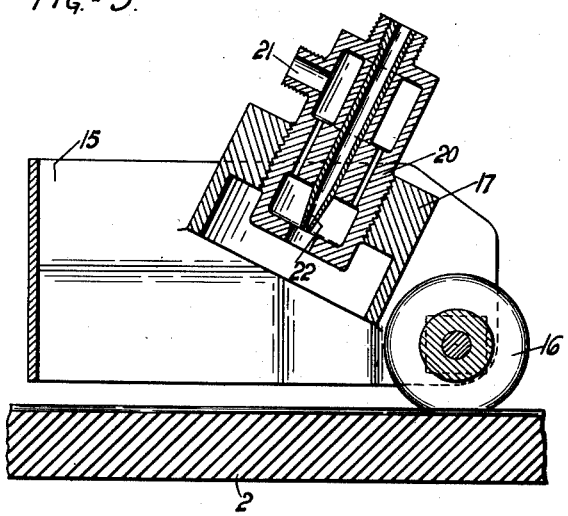
Figure 3 is an enlarged longitudinal section through the striping tool.
Figure 4:
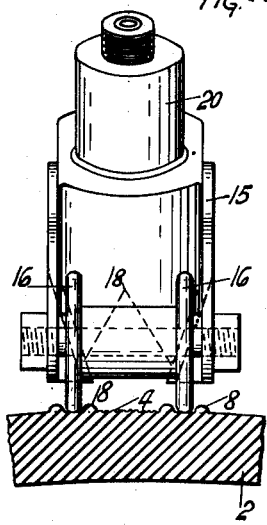
Figure 4 is an end view thereof.
Figure 5:
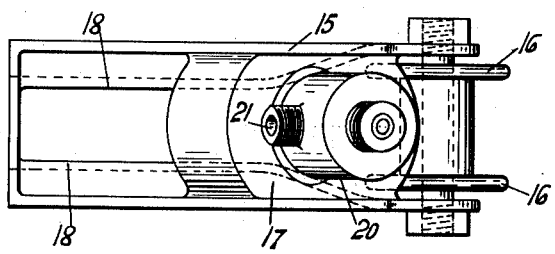
Figure 5 is a top plan view.
Figure 6:
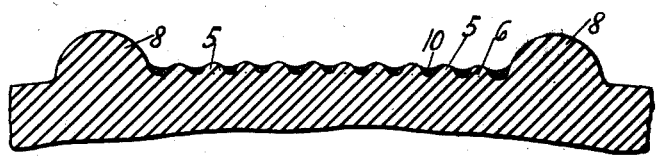
Figure 6 is an enlarged section of the portion of the tire located at the stripe.

The tire casing is indicated by the numeral 1, being supported in a horizontal plane upon a revolving table or stand 2. The tread portion of the tire is indicated at 3 and the stripe at 4.

In order to obtain the best results as described, that portion of the tire where the stripe is to be applied is vulcanized in a mold so as to have formed therein a plurality of parallel circumferential ribs or corrugations 5, the depressions or valleys between the ribs being designated at 6. On either side of the shaped area are located enlarged ribs 8 which not only serve to protect the stripe but also as a guide for the striping tool. These ribs may be arranged in pairs although such an arrangement is not essential.

The contrasting coloring material is preferably a fluid rubber cement having the proper pigments therein to give the desired color to the stripe. This cement is applied preferably by spraying so that it fills the valleys or depressions in the striped area in pools indicated at 10, the ribs being exposed. The ribs are so fine that viewed at a distance, the pigmented strip appears to be solid. It will be noted however, that the pools of colored cement are protected by the ribs and cannot be rubbed off easily, and this result is accomplished without the provision of the outside ribs 8. It is obvious that other striping material than rubber cement may be employed, but this substance is preferably employed as it bonds with the rubber of the background.

A convenient form of apparatus to be employed in the process is illustrated in the drawings. This consists generally of a spray gun which is held by the operator as the tire is revolved. It consists of a frame 15, which is open at its under side and is supported by a pair of rollers 16 of the proper gage to track between the ribs 8, so that the spray gun 17 is directed toward the prepared background in the tire. If desired the walls of the frame 15 may be bent inwardly as shown at 18 to confine the spray directly over the area to be striped. The gun comprises a nozzle 20 through which air under pressure is directed from the inlet 21 to and surrounding the nozzle 22 for the coloring fluid.

In operation the vulcanized tire is placed on the table and rotated. The gun is applied to the side of the tire with the rollers 16 properly located and air is turned in to the gun. The air pressure sprays the colored cement in the area in which the ribs 5 are located, and the cement collects in the pools and quickly dries giving the striped effect. The operation is done rapidly and effectively and the work is done perfectly without the use of skilled labor.

The advantages in economy and appearance will be apparent to those skilled in this art. The invention is not limited to the exact details which have been shown and described but may be varied or modified within the scope of the invention as set forth in the claims.

What is claimed is:

1. The process of marking tires comprising preparing an area to be marked with a color contrasting with color of the main surface of the tire by forming thereon a plurality of fine, closely spaced depressions, and applying rubber cement of a contrasting color to the area so that it will collect in pools in the depressions.

2. The process of marking tires comprising preparing an area to be marked with a color contrasting with the color of the main surface of the tire by forming thereon a plurality of fine, closely spaced depressions, and applying liquid coloring material of a contrasting color to the area so that it will collect in pools in the depressions.

WILLIAM G. LERCH.